Patented Nov. 1, 1949

2,486,855

UNITED STATES PATENT OFFICE 2,486,855

POLYMERIZATION OF VINYL ESTERS IN AN AQUEOUS EMULSION

Edward Lavin and Charles L. Boyce, Springfield, Mass., assignors to Shawinigan Resins Corporation, Springfield, Mass., a corporation of Massachusetts No Drawing. Application January 7, 1947, Serial No. 720,634

8 Claims. (Cl. 260—89.1)

This invention relates to the polymerization of vinyl esters of saturated aliphatic acids. More particularly, this invention relates to the polymerization of vinyl esters of saturated aliphatic acids in aqueous suspension.

It has been known to polymerize vinyl esters of aliphatic acids in aqueous suspension using various types of dispersing agents. However, such prior polymerization processes and the products resulting therefrom have tended to be deficient in certain respects. For example, when salts have been used as dispersing agents, removal of the salts from the polymer has presented a serious problem and if the salts are not removed, the polymers tend to be lacking in clarity, stability, electrical resistance and the like.

It is an object of this invention to provide a new process for polymerizing vinyl esters of saturated aliphatic acids. A particular object of this invention is to provide a new process for polymerizing vinyl esters of saturated aliphatic acids in aqueous suspension. A further object is the provision of granular polymerization products of vinyl esters of saturated aliphatic acids free from salts.

These and other objects are attained according to this invention by subjecting to polymerization conditions an aqueous dispersion of a vinyl ester of a saturated aliphatic acid in the presence of a heteropolymer of vinyl acetate and maleic acid or anhydride, said heteropolymer being free from salt groups. Thus, a dilute aqueous solution of a heteropolymer of vinyl acetate and maleic acid or anhydride is used as the dispersion medium for polymerizing vinyl esters of saturated aliphatic acids.

The following examples are illustrative of the present invention, but are not to be considered as limitative thereof. Where parts are mentioned, they are parts by weight.

Example I

| | Parts |
|---|---|
| Vinyl acetate | 40 |
| Water | 60 |
| Vinyl acetate-maleic anhydride heteropolymer (made by mass polymerization of a mixture of vinyl acetate and maleic anhydride in equimolecular proportions) | 0.04 |
| Benzoyl peroxide | 0.16 |

The above ingredients are charged to a suitable reaction vessel equipped with an agitator and return water-cooled condenser. Thereafter, the mixture is heated with stirring to the reflux temperature thereof and refluxed gently for 2 hours. The product comprises spherical beads of polyvinyl acetate about 1 mm. in diameter which are purified by washing with water and drying at 60° C. under vacuum.

Example II

Example I is repeated except that the vinyl acetate-maleic anhydride heteropolymer is made by mass polymerization of a mixture of 98 molecular proportions of vinyl acetate and 2 molecular proportions of maleic anhydride.

The product is similar to that obtained in Example I, except that the polymer beads are somewhat larger in particle size.

Example III

Example II is repeated except that the vinyl acetate-maleic anhydride heteropolymer is made by polymerization in the presence of benzene. The product is similar to that obtained in Example I.

The granular polymers of polyvinyl acetate obtained in the above examples are characterized by uniformity of particle size, freedom from haze and good electrical properties. Such advantageous characteristics are to be contrasted with vinyl acetate polymerization products made in the presence of metallic salts which tend to be turbid and deficient in electrical resistance.

Numerous variations may be introduced into the process of the invention as exemplified by the examples. The polymerizing temperature may be substantially varied and the temperature employed may be governed by the particular characteristics desired in the polymeric material and other polymerization conditions, e. g. catalyst concentration, monomer-water ratio, etc. The amounts of dispersing agent may be substantially varied, for example, from 0.005 to 5.0% may be used, based on the amount of water. The exact amount employed depends to some extent on the ratio of monomer to water, the temperature of the polymerization, etc. Preferably, at least 0.05% dispersing agent based on the water is employed to avoid danger of coalescence of the particles during polymerization. Under most conditions, it is not necessary to use more than 0.2%–0.5% dispersing agent based on the water in order to produce granular polymer particles of small and uniform particle size, although the use of larger amounts such as those mentioned above, is not precluded for certain purposes, as for example, in making products in which the polymer particles are of extremely fine size.

The ratio of monomer to water is not critical and by suitable correlation of the factors involved in the polymerization, weight ratios of monomer to water may be substantially varied. Usually the monomer : water ratio does not exceed 1:1 and on the other hand, it is usually not desirable to use a monomer : water ratio of less than 1:9. When operating within these limits, the dispersing agent concentration may suitably be within the limits mentioned above.

The vinyl acetate-maleic acid or anhydride heteropolymer may be prepared by the usual methods for making such polymers, as for example, polymerization in solution, in mass, or in a liquid which is a solvent for the monomeric materials, but not for the heteropolymer.

The suspending agents used in Examples I and II are prepared by heating a solution of the maleic anhydride in the vinyl acetate at the boiling point of the mixture under reflux conditions for 2 hours. The polymer which precipitates during the polymerization is separated by decanting the supernatant liquid comprising unpolymerized material and purified by dissolving in acetone, re-precipitating by addition of methanol, washing several times with methanol and drying.

The suspending agent used in Example I is made from a mixture of equal molecular proportions of vinyl acetate and maleic anhydride. The suspending agent used in Example II is made from a mixture of 98 molecular proportions of vinyl acetate and 2 molecular proportions of maleic anhydride.

The suspending agent used in Example III is prepared by heating at the reflux temperature for 3-4 hours a mixture of 210 parts of vinyl acetate, 4.9 parts of maleic anhydride, 0.18 part of benzoyl peroxide and 1585 parts of benzene. Initially, the monomeric materials are in solution, but as the polymer forms, it separates from the reaction mixture and the product comprises the heteropolymer suspended in a mixture of benzene and residual monomers. The heteropolymer is separated from the reaction mixture by filtration, washed with benzene and dried.

In place of benzene, other materials which are solvents for the monomers but not for the heteropolymer may be used, e. g., toluene, xylene, etc.

The molecular weight of the dispersing agent, as evidenced by the specific viscosity of dilute solutions thereof, may be substantially varied, for example, by employing various polymerization temperatures, types and amounts of catalysts, etc.

The molar proportions of combined vinyl acetate and maleic acid or anhydride in the heteropolymer may be substantially varied. Since maleic acid or anhydride does not readily combine with itself, the heteropolymers do not usually contain more than 50% of maleic acid or anhydride on a molar basis, even when higher proportions are used in the polymerization mix, although the use of heteropolymers containing larger amount of maleic acid or anhydride is not precluded, e. g., up to 80 or 90% maleic anhydride on a molar basis.

The lower limit of maleic acid or anhydride in the heteropolymer is the amount which is sufficient to render the heteropolymer soluble in water at the temperatures and concentrations at which it is to be used. Due in part to the tendency of maleic acid or anhydride and vinyl acetate to combine in approximately a 1:1 molar ratio regardless of the proportions in the polymerization mix, water-soluble heteropolymers are formed when as little as 1-2 mols of maleic acid or anhydride is mixed with 99-98 mols of vinyl acetate and the mixture subjected to polymerizing conditions.

Thus, in terms of initial composition, the molar ratio of maleic acid or anhydride to vinyl acetate may vary widely, e. g., from 99:1 to 1:99. However, for most purposes, a 50:50 molar mixture is found to produce a suitable heteropolymer, thereby avoiding undue waste of materials.

In place of vinyl acetate, other vinyl esters of saturated aliphatic acids may be used, such as vinyl propionate, vinyl butyrate, vinyl valerate, vinyl hexoate, vinyl palmitate, etc. It is found that the invention is particularly suitable for polymerization of vinyl esters of saturated aliphatic acids containing 2-6 carbon atoms.

In place of benzoyl peroxide, other per compounds may be used in carrying out the polymerization, for example, hydrogen peroxide, lauroyl, peroxide, ditertiary butyl peroxide, oleyl peroxide, toluyl peroxide, acetyl peroxide, urea peroxide and the like, as well as mixtures of two, three or more of these and other catalysts. In general, the water-insoluble per compounds are preferred. In certain cases, the action of light may also be helpful in expediting the polymerization in the presence or absence of catalysts of the type mentioned above. The foregoing also illustrates suitable catalysts for use in making the heteropolymer dispersing agent.

The foregoing description is given in illustration and not in limitation of the invention as set forth in the appended claims.

What is claimed is:

1. A process for polymerizing vinyl esters of saturated aliphatic acids which comprises subjecting to polymerizing conditions an aqueous dispersion containing a vinyl ester of a saturated aliphatic acid dispersed therein, there being dissolved in the aqueous medium a water-soluble heteropolymer of vinyl acetate and a compound selected from the group consisting of maleic acid and maleic anhydride, said heteropolymer being free from salt groups.

2. A process as defined in claim 1 in which the vinyl ester is a vinyl ester of a saturated aliphatic acid containing 2-6 carbon atoms.

3. A process as defined in claim 1 in which the vinyl ester is vinyl acetate.

4. A process as defined in claim 1 in which the heteropolymer is present in the proportion of 0.005-0.5% based on the amount of water.

5. A process for polymerizing vinyl acetate which comprises subjecting to polymerizing conditions an aqueous dispersion containing vinyl acetate dispersed therein and 0.005-0.5%, based on the water present, of a water-soluble heteropolymer of vinyl acetate and a compound selected from the group consisting of maleic acid and maleic anhydride, said heteropolymer being free from salt groups.

6. A process as defined in claim 5 in which the heteropolymer contains not over 50% on a molar basis of a compound from the group consisting of maleic acid and maleic anhydride.

7. A process as defined in claim 5 in which a water-insoluble peroxide catalyst is present.

8. A process as defined in claim 5 in which benzoyl peroxide is present as a catalyst.

EDWARD LAVIN.
CHARLES L. BOYCE.

REFERENCES CITED

The following references are of record in the file of this patent:

UNITED STATES PATENTS

| Number | Name | Date |
|---|---|---|
| 2,194,354 | Crawford et al. | Mar. 19, 1940 |
| 2,245,040 | Marks | June 10, 1941 |
| 2,294,226 | D'Alelio | Aug. 25, 1942 |
| 2,306,071 | McNally | Dec. 22, 1942 |